W. O. SIMMONS.
HORSE RELEASING DEVICE.
APPLICATION FILED MAR. 22, 1913.
1,065,559.
Patented June 24, 1913.
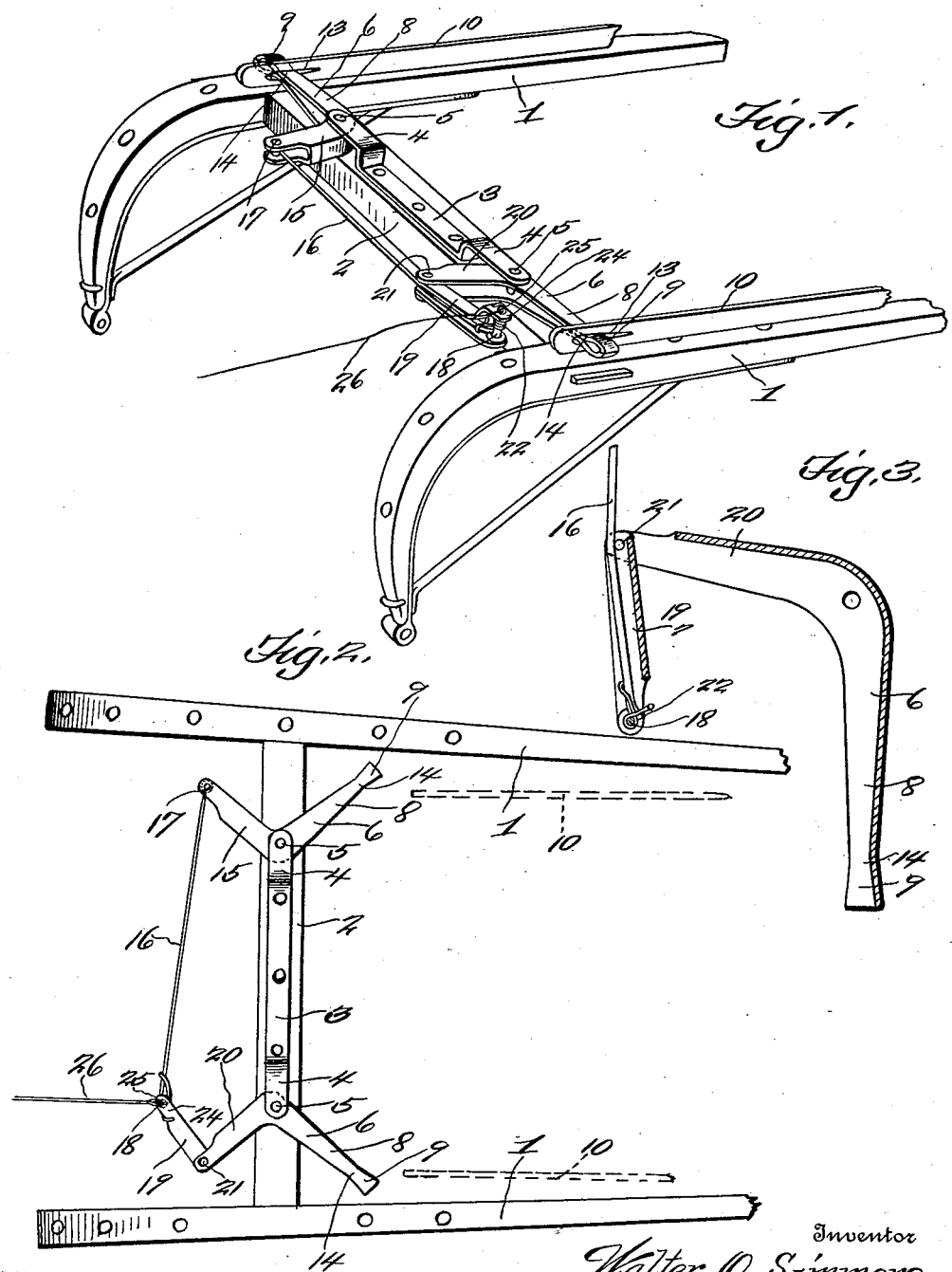

UNITED STATES PATENT OFFICE.

WALTER O. SIMMONS, OF HARTSELLS, ALABAMA.

HORSE-RELEASING DEVICE.

1,065,559.  Specification of Letters Patent.  Patented June 24, 1913.

Application filed March 22, 1913. Serial No. 756,168.

*To all whom it may concern:*

Be it known that I, WALTER O. SIMMONS, a citizen of the United States, residing at Hartsells, in the county of Morgan and State of Alabama, have invented a new and useful Horse-Releasing Device; and I do hereby declare the following to be a full, clear, and exact description of the invention, such as will enable others skilled in the art to which it appertains to make and use the same.

This invention relates to vehicle shafts, and particularly to new and useful swingle trees constructed in the form of bell crank members, not only acting as swingle trees, but so connected with one another and arranged, that when the connections are operated by pulling upon a cord, the traces of the harness will instantly and automatically slip or detach from the swingle tree, thereby instantly releasing the horse, in case he becomes uncontrollable.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in perspective of a pair of vehicle shafts equipped with the improved bell crank swingle tree, showing their connection. Fig. 2 is a plan view showing the swingle trees actuated whereby the traces are released. Fig. 3 is an enlarged detail sectional view through one of the swingle trees showing a link connected thereto, which in turn is adapted to be connected to the other swingle tree by means of a rod.

Referring more especially to the drawings, 1 designates the vehicle shafts connected by the cross bar 2. Bolted or otherwise secured to the cross bar 2 is a plate 3 having its end portions 4 offset to but parallel to the bar 2. Pivoted between the offset portions 4 and the bar 2 upon the bolts 5 are bell crank members constituting swingle trees 6. These swingle trees are constructed of sheet metal, and made hollow. The arms 8 of the swingle trees have enlargements 9, over which the trace 10 is forced, so that the openings 13 of the traces engage the necks 14 of the arms. The arm 15 of one of the swingle trees has a rod 16 connected to it as at 17. This rod 16 is in turn pivoted upon a bolt 18 extending through one end of a link 19, which link 19 is in turn pivoted between the sides of the arm 20 of the other swingle tree, by means of the pivot pin or bolt 21. Coiled about the bolt 18 is a spring 22, one end of which bears against the connecting rod, while the other end of said spring bears against an arm of the link 19; this arm of the link 19 is designated by the numeral 24. The link 19 is also constructed of sheet metal bent upon itself to appear U-formed in cross section, so as to receive a portion of the connecting rod, so that the pivotal connection between the rod and the bolt 18 will assume a position offset or out of alinement with the pivotal connection between the link 19 and the arm 20, so that as long as the swingle trees remain in proper working condition and the horse remains passive, the link 19 will not collapse. However, as soon as the horse becomes uncontrollable, the occupant of the vehicle, may upon pulling upon the cord 26 (which is connected to the eye 25 of the bolt 18) collapse the link 19 to a position shown in Fig. 2, thereby releasing the traces. Upon releasing the traces, the horse may then free himself from the vehicle shaft, owing to the fact that the back straps or breech straps may be connected to the shaft by any conventional form of quick detachable means (not shown).

The invention having been set forth, what is claimed as new and useful is:—

1. In combination with a pair of vehicle shafts, a plate secured to the connecting bar of said shafts, bell crank swingle trees fulcrumed between the ends of said plate and the connecting bar having long and short arms, a link pivoted to a short arm of one of the swingle trees and having a connection with the short arm of the other swingle tree, spring connections between said link and said connection, and means for collapsing the link and said connection against the action of the spring means.

2. In combination with a pair of vehicle shafts, a plate secured to the connecting bar of said shafts, a pair of bell crank swingle trees fulcrumed between the ends of said plate and the connecting bar, one arm of each swingle tree adapted to act in alinement with the corresponding arm of the other swingle tree and to be connected by a trace, a link pivoted to the other arm of one of the swingle trees and having a rod connection with the corresponding arm of the other swingle tree, the pivotal connection between the link and the connecting rod being offset or out of alinement of the pivot between the link and its swingle tree, with the connecting rod in contact with the pivot bolt connecting the link to the swingle tree, thereby constituting means for the traces to pull against, spring means acting between the link and the connecting rod to hold the connecting rod against said pivot bolt, and means for collapsing said link and connecting rod against the action of the spring means.

In testimony whereof I have signed my name to this specification in the presence of two subscribing witnesses.

WALTER O. SIMMONS.

Witnesses:
R. D. FOOTE,
TASSIE ROLFE.

Copies of this patent may be obtained for five cents each, by addressing the "Commissioner of Patents, Washington, D. C."